(12) United States Patent
Choi et al.

(10) Patent No.: US 6,745,205 B2
(45) Date of Patent: Jun. 1, 2004

(54) METHOD OF INDEXING AND SEARCHING FEATURE VECTOR SPACE

(75) Inventors: Yang-lim Choi, Suwon (KR); Youngsik Huh, Suwon (KR); B. S. Manjunath, Santa Barbara, CA (US); Shiv Chandrasekaran, Santa Barbara, CA (US)

(73) Assignees: Samsung Electronics Co., Ltd., Kyungki-Do (KR); The Regents of the University of California, Oakland, CA (US)

( * ) Notice: Subject to any disclaimer, the term of this patent is extended or adjusted under 35 U.S.C. 154(b) by 7 days.

(21) Appl. No.: 09/794,401

(22) Filed: Feb. 28, 2001

(65) Prior Publication Data

US 2002/0085011 A1 Jul. 4, 2002

Related U.S. Application Data

(60) Provisional application No. 60/252,391, filed on Nov. 15, 2000.

(30) Foreign Application Priority Data

Dec. 20, 2000  (KR) ........................................ 2000-79180

(51) Int. Cl.⁷ ............................................... G06F 17/30
(52) U.S. Cl. ......................................... 707/104.1; 707/3
(58) Field of Search ................................ 707/1, 2, 3, 4, 707/5, 6, 100, 104.1, 200

(56) References Cited

U.S. PATENT DOCUMENTS 6,122,628 A * 9/2000 Castelli et al.

* cited by examiner

*Primary Examiner*—Diane D. Mizrahi
*Assistant Examiner*—Yicun Wu
(74) *Attorney, Agent, or Firm*—Sughrue Mion, PLLC

(57) ABSTRACT

A method of indexing a high-dimensional vector space, along with a method of quickly retrieving a feature vector having features similar to a query vector from the vector space indexed by the indexing method, are provided. The method of indexing a feature vector space includes the steps of (a) partitioning the feature vector space into a plurality of approximation regions; (b) selecting an arbitrary approximation region to determine whether the selected approximation region is heavily or sparsely distributed; and (c) if the approximation region is determined to be sparsely distributed, indexing the corresponding approximation region as one special node belonging to a child node of the tree data structure, together with any other sparsely distributed approximation region spaced apart by a distance less than a predetermined distance.

9 Claims, 4 Drawing Sheets

METHOD OF INDEXING AND SEARCHING FEATURE VECTOR SPACE

The present application is based on Korean Patent Application No. 00-79180 filed on Dec. 20, 2000, and upon U.S. Provisional Application No. 60/252391 filed on Nov 15, 2000, both of which are incorporated herein by reference.

BACKGROUND OF THE INVENTION

1. Field of the Invention

The present invention relates to a method of indexing a feature vector space, and more particularly, to a method of indexing a high-dimensional feature vector space. Furthermore, the present invention relates to a method of quickly searching the feature vector space indexed by the indexing method for a feature vector having features similar to a query vector.

2. Description of the Related Art

Feature elements such as color or texture of images or motion pictures can be represented by vectors. These vectors are called feature vectors. The feature vectors are indexed in a vector space in which the feature vectors exist such that a feature vector having features similar to a query vector can be found.

According to an ordinary indexing method for a feature vector space, data partitioning and space divisional schemes based on a tree data structure, such as an R tree or an X tree, are utilized in indexing a low-dimensional feature vector space. Furthermore, a vector approximation (VA) approach is utilized in indexing a high-dimensional feature vector space by assuming vectors having similar features belong to the same hypercube.

Indexing of feature vectors in a high-dimensional feature vector space according to this ordinary indexing method based on VA, however, may expend much time in retrieving from the feature vector space a feature vector similar to a query vector. Thus, there still remains a need for an indexing method for reducing the required retrieval time.

SUMMARY OF THE INVENTION

To solve the above problems, it is an object of the present invention to provide a method of indexing a feature vector space that can reduce a time required for retrieving a feature vector similar to a query vector by adaptively indexing the feature vector space according to the density of feature vectors.

It is another object of the present invention to provide a method for quickly retrieving from this indexed vector space a feature vector having features similar to a query vector.

Accordingly, to achieve the above objects, the present invention provides a method of indexing a feature vector space including the step of indexing an approximation region in which feature vector elements are sparsely distributed as one special node belonging to a child node of the tree structure, together with any other sparsely distributed approximation region spaced apart by a distance less than a predetermined distance.

The present invention also provides a method of indexing a feature vector space including the steps of (a) partitioning the feature vector space into a plurality of approximation regions, (b) selecting an arbitrary approximation region to determine whether the selected approximation region is heavily or sparsely distributed, and (c) if the approximation region is determined to be sparsely distributed, indexing the corresponding approximation region as one special node belonging to a child node of the tree structure, together with another sparsely distributed approximation region spaced apart by a distance less than a predetermined distance. Preferably, the steps (b) and (c) are repeatedly performed on all approximation regions partitioned in the step (a).

Furthermore, prior to the step (c), the indexing method further includes the step of (c-1) if the approximation region selected in the step (b) is determined to be heavily distributed, indexing the corresponding approximation region as an ordinary node, partitioning the corresponding approximation region into a plurality of sub-approximation regions, and repeating the step (b) for the partitioned sub-approximation regions.

After the step (c), the indexing method further includes the steps of (d) determining whether all approximation regions are indexed as special nodes, (e) if all approximation regions are not indexed as special nodes, selecting the next approximation region and performing the steps after (b) on the approximation region repeatedly, and (f) if all approximation regions are indexed as special nodes, completing the indexing. The plurality of approximation regions may be subspaces used in random indexing. Alternatively, the plurality of approximation regions may be subspaces used in multi-dimensional scaling (MDS), Fast-map, or locality sensitive hashing.

The step (c) includes the step of (c') if the approximation region is determined to be sparsely distributed, indexing the corresponding approximation region as one special node belonging to a child node of the tree structure together with an adjacent sparsely distributed approximation region.

The present invention also provides a method of retrieving a feature vector having features similar to a query vector from a vector space indexed by an indexing method using a tree structure including the step of indexing an approximation region in which feature vector elements are sparsely distributed as one special node belonging to a child node of the tree structure, together with another sparsely distributed approximation region spaced apart by a distance less than a predetermined distance. The retrieval method includes the steps of (a) determining a special node to which the query vector belongs, (b) setting the distance between an element of the query vector and an element in an approximation region corresponding to the determined special node, which is the closest to the element of the query vector, as a first threshold value, and (c) excluding all child nodes of the corresponding node if the distance between the query vector and the approximation region indexed as an ordinary node is greater than or equal to the first threshold value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 1:
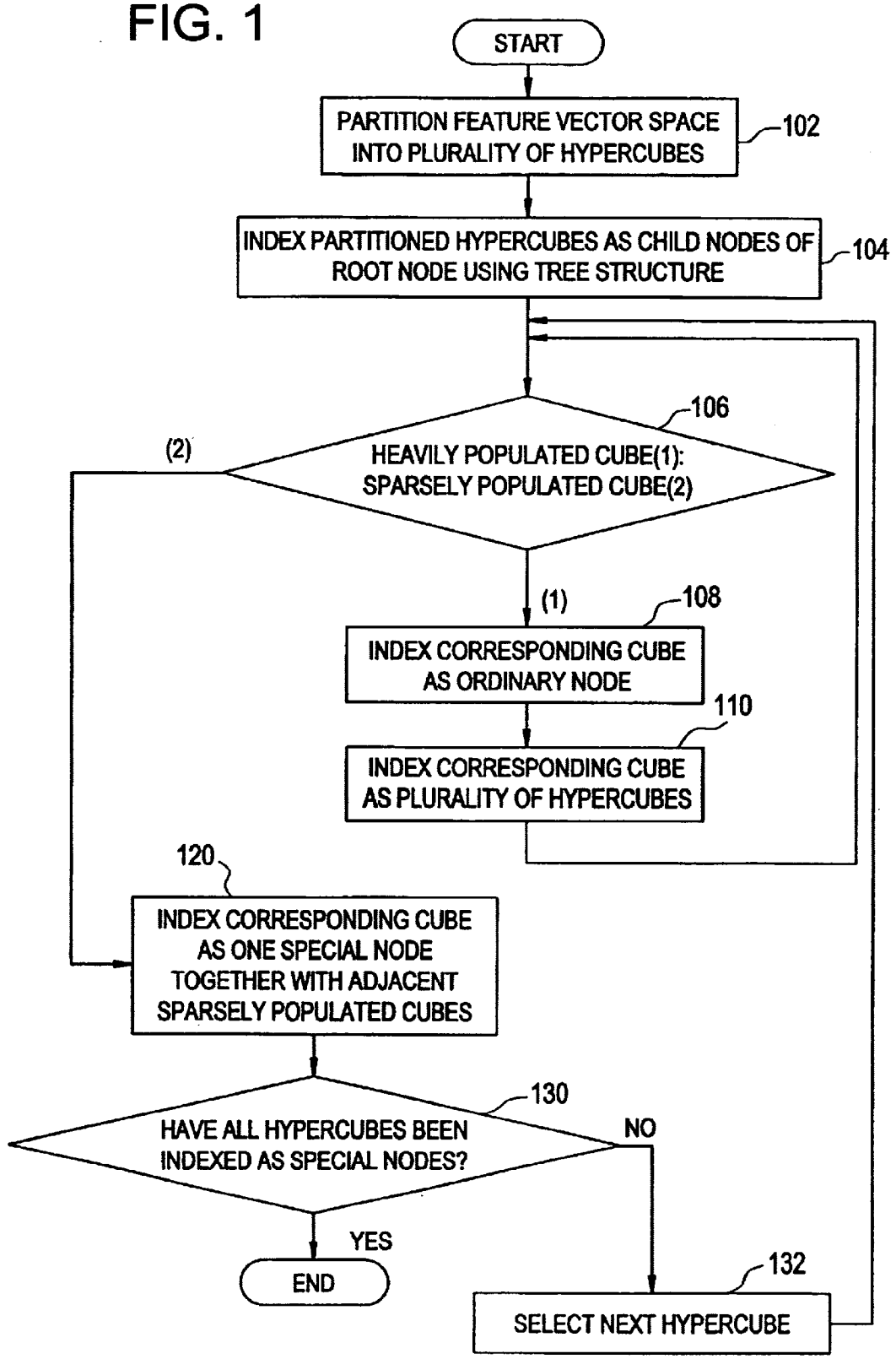
FIG. 1 is a flowchart showing the main steps of a method of indexing a feature vector space according to an embodiment of the present invention.
Figure 2:
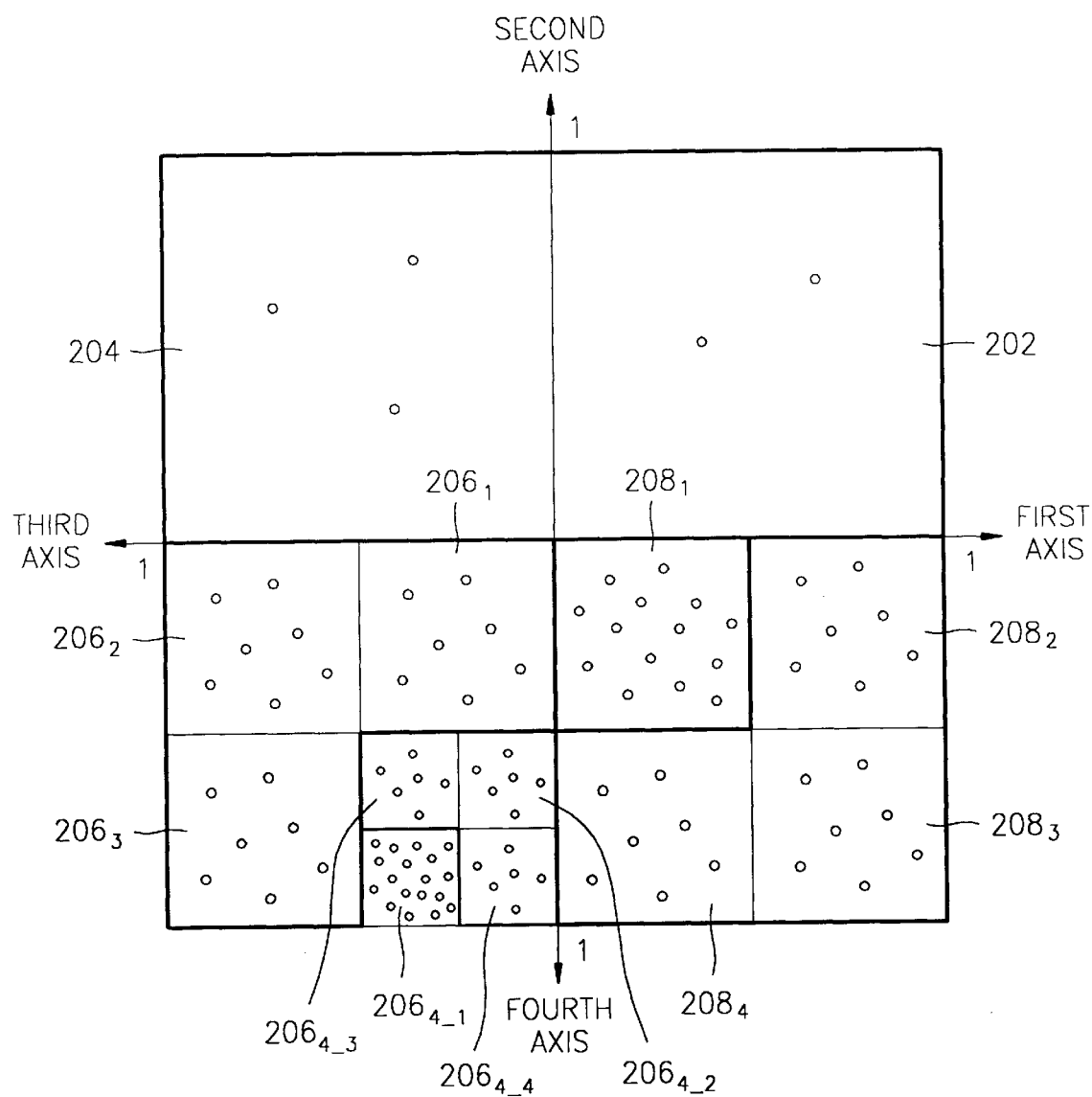
FIG. 2 shows an example of a feature vector space indexed by the method shown in FIG. 1.

FIG. 1 shows a method of indexing a feature vector space according to an embodiment of the present invention. The feature vector space is first partitioned into a plurality of hypercubes (step 102). FIG. 2 shows an example of a feature vector space indexed according to the indexing method of FIG. 1. Meanwhile, feature vectors in the feature vector space may be represented by an n-dimensional vector where n is a positive integer. In other words, assuming a database including N feature vectors is D where N is a positive integer, the feature vectors may be represented by an n-dimensional vector in the vector space $R^n$.

Although this embodiment is described with reference to an example in which the feature vector space is partitioned into a plurality of hypercubes, the feature vector space may be partitioned into subspaces used in more improved indexing schemes such as random indexing, multi-dimensional scaling, Fast-map, and locality sensitive hashing.

Figure 3:
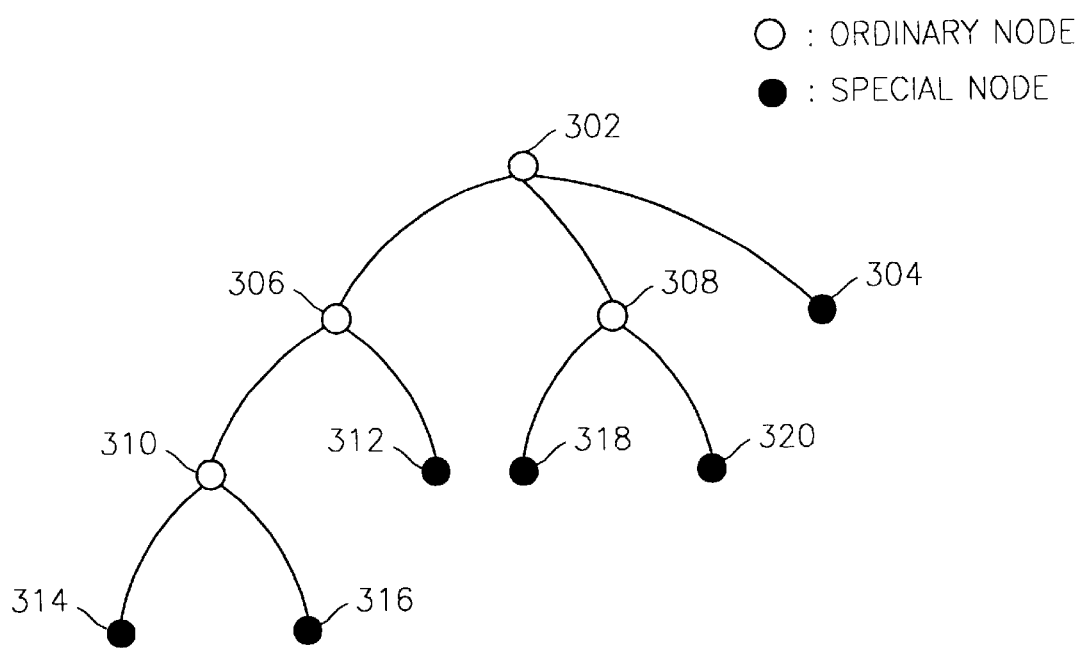
FIG. 3 shows an example of a tree data structure for indexing the feature vector space of FIG. 2.

Next, the partitioned hypercubes are indexed as child nodes of a root node using a tree structure (step 104). The tree structure basically has a root node and a plurality of child nodes branched from the root node. FIG. 3 shows an example of a tree data structure for indexing the feature vector space of FIG. 2.

Next, an arbitrary hypercube, which is one of child nodes of a root node 302, is selected to determine whether the hypercube is heavily or sparsely populated (step 106). Here, the root node 302 is an initial hypercube $[0,1]^n$, and the child nodes of the root node are sub-cubes of $[0,1]^n$. The root node 302 is considered to be in level 0. Furthermore, the child nodes of the root node 302 are in level 1, and the child nodes of the child node of the root node are in level 2.

If the selected hypercube is determined in the step 106 to be heavily populated, the corresponding hypercube is indexed as an ordinary node (step 108) and partitioned into a plurality of hypercubes (step 110). On the other hand, if the selected hypercube is determined in the step 106 to be sparsely populated, the corresponding hypercube is indexed as one special node together with adjacent sparsely populated hypercubes (step 120). Although this embodiment has been described with reference to an example in which the corresponding hypercube determined to be sparsely populated is indexed as one special node together with adjacent sparsely populated hypercubes, it is possible to index this hypercube as one special node together with another sparsely populated hypercube, which is spaced apart by a distance less than a predetermined distance. Next, when the corresponding hypercube is partitioned into a plurality of hypercubes, the steps after step 106 are repeatedly performed on each of the partitioned hypercubes.

In this embodiment, referring to FIGS. 2 and 3, a hypercube 202 determined to be sparsely populated, and a hypercube 204 are indexed as a special node 304. On the other hand, a hypercube 206 determined to be heavily populated and a hypercube 208 are indexed as ordinary nodes 306 and 308, respectively. Also, the hypercube determined to be heavily populated is partitioned into a plurality of sub-hypercubes $206_1$, $206_2$, $206_3$, and $206_4$. It is then determined whether the partitioned sub-hypercubes $206_1$, $206_2$, $206_3$, and $206_4$ are heavily or sparsely populated. The hypercube 2064 determined to be heavily populated is indexed as an ordinary node 310. On the other hand, the hypercubes $206_1$, $206_2$, and $206_3$ determined to be sparsely populated are indexed as one special node 312. The hypercube $206_4$ determined to be heavily populated is partitioned into a plurality of sub-hypercubes $206_{4\_1}$, $206_{4\_2}$, $206_{4\_3}$, and $206_{4\_4}$. Next, it is determined whether the partitioned sub-hypercubes $206_{4\_1}$, $206_{4\_2}$, $206_{4\_3}$, and $206_{4\_4}$ are heavily or sparsely populated and the cube $206_{4\_1}$ determined to be heavily populated is indexed as an ordinary node and is partitioned into a plurality of sub-hypercubes again, in which case all partitioned cubes are determined to be sparsely populated and thus indexed as a special node 314. On the other hand, the cubes $206_{4\_2}$, $206_{4\_3}$, and $206_{4\_4}$ are determined to be sparsely populated and are indexed as a special node 316.

Subsequent to the step 120, it is determined whether all hypercubes are indexed as special nodes (step 130). If it is determined that all hypercubes are not indexed as special nodes, the next hypercube is selected (step 132) to perform the steps 106 and subsequent steps repeatedly. On the other hand, if it is determined that all hypercubes are indexed as special nodes, indexing is finished.

That is, returning to FIG. 2, the hypercube 208 determined to be heavily populated is partitioned into a plurality of sub-hypercubes $208_1$, $208_2$, $208_3$, and $208_4$. Next, it is determined whether the partitioned sub-hypercubes $208_1$, $208_2$, $208_3$, and $208_4$ are heavily or sparsely populated, and the hypercube $208_1$ determined to be heavily populated is indexed as an ordinary node. However, the hypercube $208_1$ is partitioned into a plurality of sub-hypercubes again, in which case all partitioned cubes are determined to be sparsely populated and thus indexed as a special node 318. On the other hand, the cubes $208_2$, $208_3$, and $208_4$ determined to be sparsely populated are indexed as a special node 320.

Figure 4:
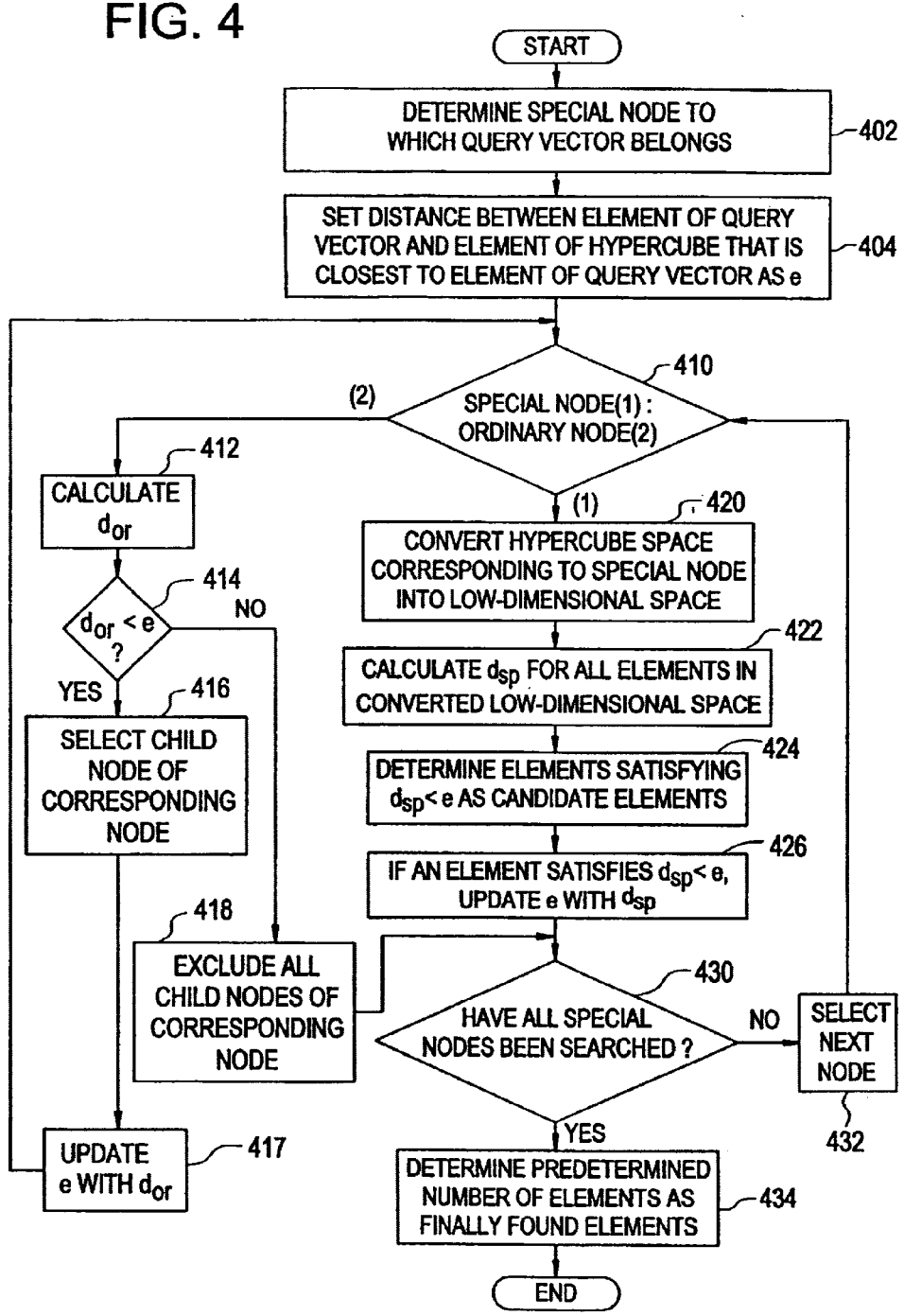
FIG. 4 is a flowchart showing the main steps of a method of retrieving from the indexed feature vector space of FIG. 1 a feature vector having features similar to a query vector.

A method of retrieving a feature vector having features similar to a query vector in the feature vector space indexed according to the indexing method described above will now be described. FIG. 4 is a flowchart showing the main steps of the method for the feature vector space shown in FIG. 1. Hereinafter, a query vector in the feature vector space $R^n$ corresponding to the database D is denoted by q, and it is assumed that the query vector q lies in a feature space defined as $[0,1]^n$ where n is a positive integer denoting the dimensionality of a feature vector space for describing feature vectors. Under the above assumptions, the following steps are performed so as to find an element of the database which is the closest to the query vector q, that is, the feature vector.

First, a special node, to which the query vector q belongs, is determined (step 402). Then, the distance between an element of the query vector q and an element in a hypercube corresponding to the determined special node, which is the closest to the element of the query vector, is set as e (step 404). An arbitrary node is selected among child nodes of the root node 302 to determine whether the selected node is a special or ordinary node (step 410). In other words, assuming that the query vector q lies in hypercube $(a_i, b_i)^n$ corresponding to a certain node of an index tree, it is determined whether the query vector lies in a heavily populated or sparsely populated node. If the selected node is determined to be an ordinary node in the step 410, the distance $d_{or}$ between the query vector q and the hypercube $n_{or}$ indexed as the ordinary node is calculated by Equation (1) (step 412):

$$d_{or} = d(q, n_{or}) = \sum_i \begin{cases} |q_i - a_i|^2 & \text{when } q_i > a_i \\ 0 & \text{when } a_i > q_i > b_i \\ |q_i - a_i|^2 & \text{when } b_i > q_i \end{cases} \quad (1)$$

Here, arbitrary interval a<x<b may be represented as pair (a, b), and hyper cube $$\prod_{1 \le i \le n}(a_i, b_i)$$

$(a_i, b_i)$ may be represented by sequence of intervals $(a_i, b_i)$.

Next, it is determined whether $d_{or}$ is less than e (step 414), and if $d_{or}$ is determined to be less than e, a child node of the corresponding ordinary node is selected (step 416). In this case, if an element that satisfies $d_{or}<e$ exists, it is preferable that e is updated with $d_{or}$ (step 417). In particular, it is preferable that an index or search structure be designed such that only one element having features most similar to the query vector q can be quickly found. On the other hand, if $d_{or}$ is determined to be greater than or equal to e, all child nodes of the corresponding node are excluded (step 418).

If the selected node is determined to be a special node in the step 410, a hypercube space corresponding to the node is converted into a low-dimensional space (step 420). That is, if the query vector q is determined to lie in a sparsely populated node in the step 410, the query vector q is projected into a low-dimensional subspace corresponding to the query vector q.

Next, the distance $d_{sp}$ between the query vector q and each element v in the hypercube np indexed as the special node are calculated by Equation (2) (step 422):

$$d_{sp} = d(q, n_{sp}) = \min_{v \in n_{sp}} d(q, v) \qquad (2)$$

Next, elements that satisfy $d_{sp}<e$ are determined to be candidate elements (step 424). In this case, it is preferable that e be updated with $d_{sp}$ if an element that satisfies $d_{sp}<e$ exists (step 426). In particular, it is preferable that an index or search structure be designed such that only one element having features most similar to the query vector q can be quickly found.

Next, it is determined whether a search is performed on all special nodes (step 430), and if it is determined that not all special nodes have been searched, the next node is selected (step 432), and then the steps after 410 are preformed recursively. On the other hand, if all special nodes are determined to have been searched, a predetermined number of elements are determined to be finally found elements (step 434).

According to the above retrieval method, if the distance $d_{or}$ between the query vector q and an element is greater than or equal to a predetermined threshold value e, which is determined to be the closest distance between the query vector q and an element in a hypercube corresponding to the special node to which the query vector q belongs, all child nodes of the corresponding node are excluded from a similarity search and hypercubes corresponding to the nodes branched from all excluded child nodes cease to be utilized in the similarity measurement for the query vector q. Furthermore, quicker retrievals can be provided by repeatedly updating the predetermined threshold value e used in the similarity measurement.

That is, a high-dimensional feature vector space indexed by the method of indexing a feature vector space according to the present invention can support functions such as a similarity search, retrieval or browsing in a salable and efficient manner. Thus, even if the size of a database increases, the time required for the similarity search and retrieval does not increase as much.

Furthermore, the method of indexing and searching a feature vector space according to the present invention can be written as a program executed on a personal or server computer. The program codes and code segments constructing the program can be easily inferred by computer programmers in the industry. Furthermore, the program can be stored in a computer-readable recording medium. The recording medium includes a magnetic recording medium, an optical recording medium, and a radio medium.

What is claimed is:

1. A method of indexing a feature vector space using a tree data structure, the method comprising:

determining a distribution of feature vector elements in a first approximation region of the feature vector space; and if the distribution of feature vector elements in the first approximation region is determined to be sparse, indexing the first approximation region, together with a second approximation region of the feature vector space, the second approximation region having a sparse distribution of feature vector elements, as one special node in the tree data structure, wherein the first approximation region and the second approximation region are spaced apart by a distance less than a predetermined distance, and wherein the special node is a child node in the tree data structure.

2. A method of retrieving a feature vector having features similar to a query vector from a vector space indexed by an indexing method using a tree structure including the step of indexing an approximation region in which feature vector elements are sparsely distributed, together with another sparsely distributed approximation region spaced apart by a distance less than a predetermined distance, as one special node belonging to a child node of the tree data structure, the retrieval method comprising the steps of:

(a) determining a special node to which the query vector belongs;

(b) setting the distance between an element of the query vector and an element in an approximation region corresponding to the determined special node, which is the closest to the element of the query vector, as a first threshold value; and (c) excluding all child nodes of the corresponding node if the distance between the query vector and the approximation region indexed as an ordinary node is greater than or equal to the first threshold value.

3. The method of claim 2, prior to the step (c) further comprising the step of:

(c') selecting an arbitrary node among child nodes of a root node and determining whether the selected node is a special or ordinary node.

4. The method of claim 3, wherein the step (c) comprises the steps of:

(c-1) if the selected node is determined to be an ordinary node in the step (c'), calculating the distance the distance $d_{or}$ between the query vector q and the approximation region nor indexed as the ordinary node according to the following equation:

$$d_{or} = d(q, n_{or}) = \sum_i \begin{cases} |q_i - a_i|^2 & \text{when } q_i > a_i \\ 0 & \text{when } a_i > q_i > b_i \\ |q_i - a_i|^2 & \text{when } b_i > q_i \end{cases}$$

(c-2) determining whether the distance $d_{or}$ between the query vector q and the approximation region nor indexed as the ordinary node is less than the first threshold value;

(c-3) if the distance do, between the query vector q and the approximation region no, indexed as the ordinary node is less than the first threshold value, selecting child nodes of the corresponding node; and (c-4) if the distance $d_{or}$ between the query vector q and the approximation region no, indexed as the ordinary node is greater than or equal to than the first threshold value, excluding all child nodes of the corresponding node.

5. The method of claim 4, after the step (c-2), further comprising the step of updating the first threshold value with the distance $d_{or}$ if the distance do, is less than the first threshold value.

6. The method of claim 3, after the step (c'), further comprising the step of if the selected node is determined to be a special node in the step (c'), converting a space of approximation region corresponding to the special node into a low-dimensional space.

7. The method of claim 4, after the step (c'), further comprising the steps of:

(c-5) if the node selected in the step (c') is determined to be a special node, converting a space of approximation region corresponding to the node into a low-dimensional space;

(c-6) calculating the distance $d_{sp}$ between the query vector q and each element v in the approximation region $n_{sp}$ indexed as the special node according to the following equation:

$$d_{sp} = d(q, n_{sp}) = \min_{v \in n_{sp}} d(q, v): \text{ and}$$

(c-7) determining elements that satisfy the requirement of the distance $d_{sp}$ being less than the first threshold value to be candidate elements.

8. The method of claim 7, after the step (c-7), further comprising the step of updating the first threshold value with the distance $d_{sp}$ if an element satisfying the requirement of the distance $d_{sp}$ being less than the first threshold value exists.

9. The method of claim 4, after the step (c-4), further comprising the steps of:

determining whether all special nodes have been searched;

selecting the next node to perform the steps after (c-1) repeatedly if all special nodes have not been searched;

determining a predetermined number of elements as finally found elements if all special nodes have been searched.

* * * * *